Inventor:
R. J. Ashby
John A. Seifert
Attorney

April 5, 1960    R. J. ASHBY    2,931,185
APPARATUS FOR USE IN LAYING SUBMARINE CABLES
Filed Aug. 21, 1956    7 Sheets-Sheet 6
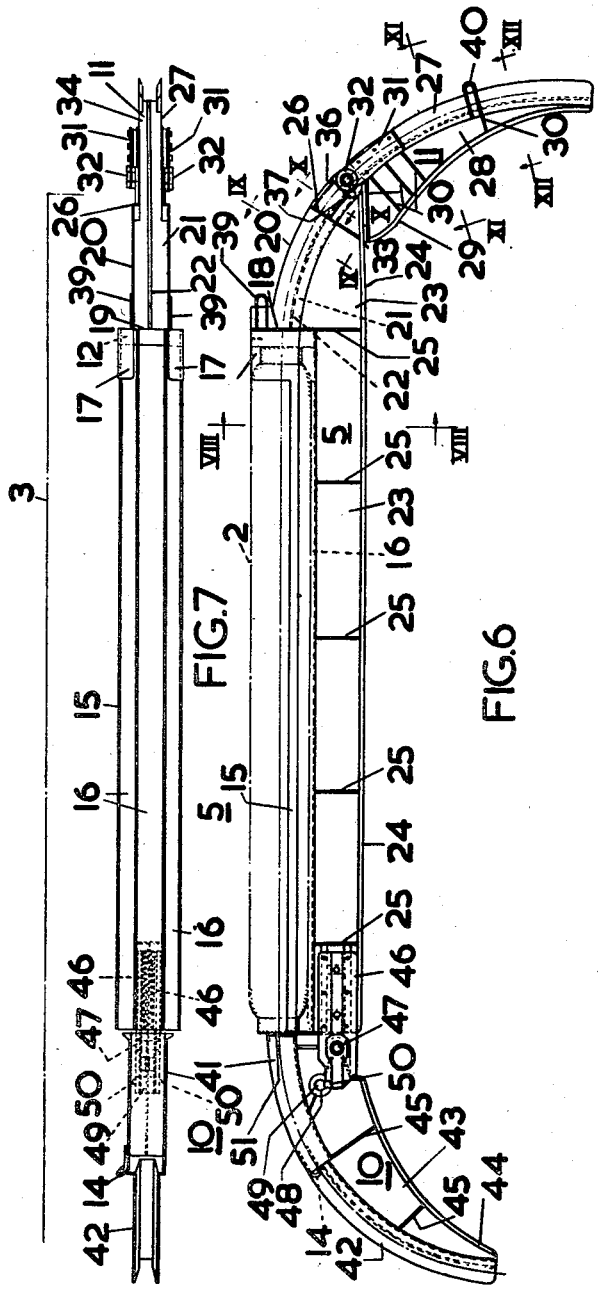
Inventor:
R. J. Ashby
John A. Seifert
Attorney

United States Patent Office 2,931,185
Patented Apr. 5, 1960

2,931,185

APPARATUS FOR USE IN LAYING SUBMARINE CABLES

Ronald Joseph Ashby, Orpington, England, assignor to Johnson & Phillips Limited, London, England, a British company Application August 21, 1956, Serial No. 605,393

9 Claims. (Cl. 61—72)

This invention relates to apparatus for use in connection with the laying of submarine cables.

In submarine cables it is now frequently the practice to connect repeaters in the line of cable at intervals of say fifty miles. Such repeaters have rigid elongated cylindrical outer casings, usually about ten feet long, and are mounted coaxially in the line of cable, and it will be seen that if the repeater is simply passed with the cable over the usual bow or stern sheave into the sea, the cable which is under a very heavy tension will during the passage of the repeater over the sheave be bent fairly sharply at the points where it joins the forward and rear ends of the repeater.

The present invention has for its object the provision of simple means by which this can be prevented.

The invention consists broadly of a cradle structure for use in submarine cable-laying systems in which the cable passes from the cable ship over a sheave into the sea, and in which the cable has one or more rigid bodies, such, for example, as repeaters, connected in the line thereof, said cradle structure being adapted to receive such rigid body and pass therewith around said sheave.

In order that the invention may be the more clearly understood an apparatus in accordance therewith will now be described, reference being made to the accompanying drawings wherein:

Figure 6 is a similar view to Figure 4 with the parts at the normal correlation.

Figure 7 is a plan of Figure 6.

Figure 1:
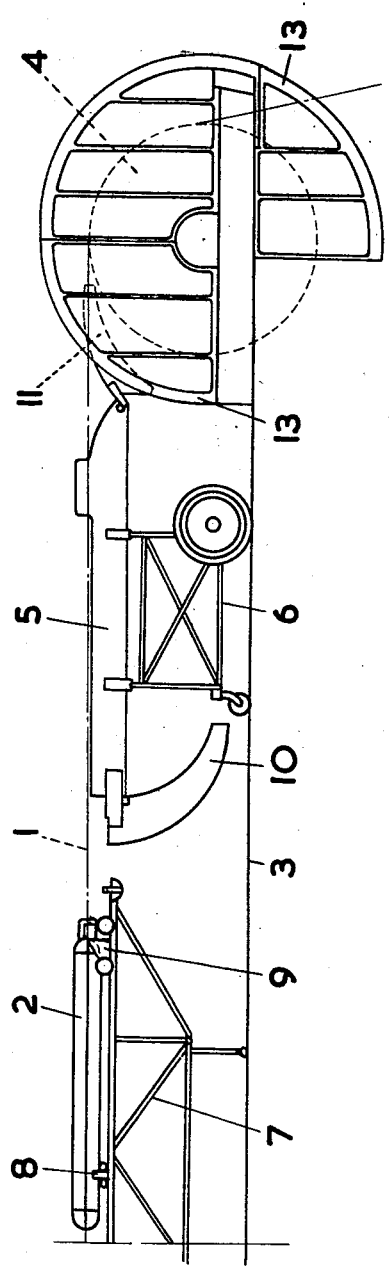
Figure 1 is a side elevation of the whole apparatus by which a repeater in a line of cable is paid out over a sheave at the stern of a ship, the repeater being shown at an early stage in the paying-out procedure.

Referring to the drawings the reference 1 designates the cable and the reference 2 a repeater connected in the line of the cable. The reference 3 designates the deck of the ship and the reference 4 the usual sheave, mounted at the bow or stern of the ship, over which the cable passes into the sea. In the present description the sheave 4 will be assumed to be at the stern of the ship.

During normal paying-out operation the cable 1 passes over the sheave 4 in the usual manner. To provide for the passage of a repeater 2 over said sheave, a cradle 5 is provided, and, shortly before a repeater is due to arrive at the sheave, said cradle is loaded by man handling onto a trolley 6 located on the deck of the ship a little to the fore of said sheave. As the repeater 2 approaches the sheave 4 it is moving aftwards on a supporting structure the rear end of which is indicated at 7 in Figures 1 to 3, said repeater being supported on small trolleys 8 and 9 which run freely along said structure.

The main body of the cradle 5 is rigid and is adapted to receive and support the repeater. Said cradle also has two end extensions 10 and 11 which extend respectively from the two ends of said main body. These end extensions 10 and 11 are hinged to said main body about transverse horizontal axes, and, at their normal positions (shown in Figure 6 and in chain dotted lines in Figure 2) both extend from said main body on a smooth downward curve which merges with said main body as clearly shown.

Figure 4:
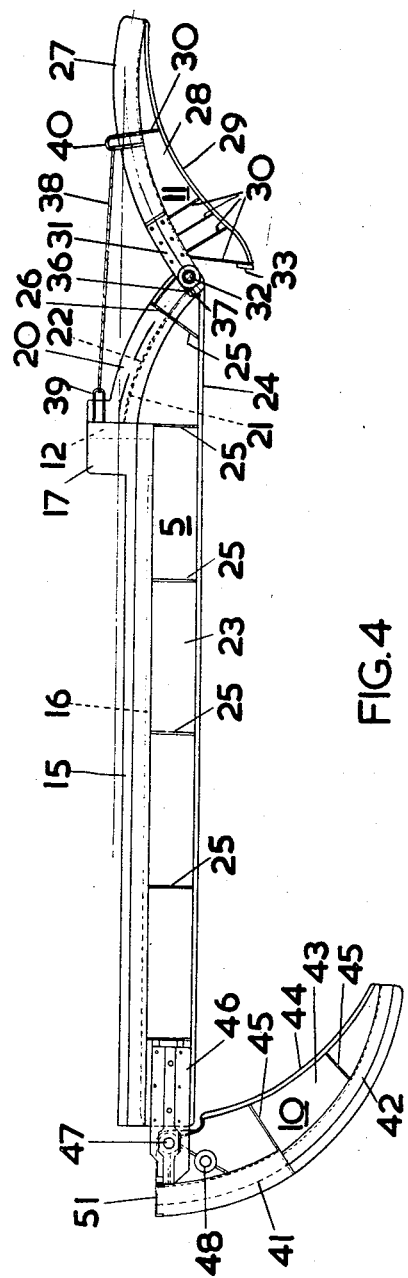
Figure 4 is a side elevation, to a larger scale, of a cradle employed in said apparatus, the parts of said cradle being shown at approximately the same correlation as in Figure 1.

The forward end extension 10 is capable of pivoting downwards from its normal position, as shown in Figures 1 and 4, and when it is at its down position, it leaves the forward end of the main body portion of the cradle open to admit the repeater. With the cradle on the trolley 6 and the end extension 10 at the down position the repeater slides aftwards from the structure 7 onto the cradle, and it will be seen that during this operation the aft one 9 of the small trolleys occupies an out-of-the-way downwardly hanging position from the end of the structure 7.

The repeater slides aftwards into the cradle until its aft end abuts against an aft end abutment 12 in said cradle (Figures 4 and 6) and thereafter continued aftwards movement of said repeater causes the cradle, together with the trolley 6 to move aftwards. When the cradle is sufficiently clear of the structure 7 the forward end extension 10 is manually pivoted upwards and locked at its normal position, and the repeater is now restrained against longitudinal movement either fore or aft relative to said cradle.

Figure 2:
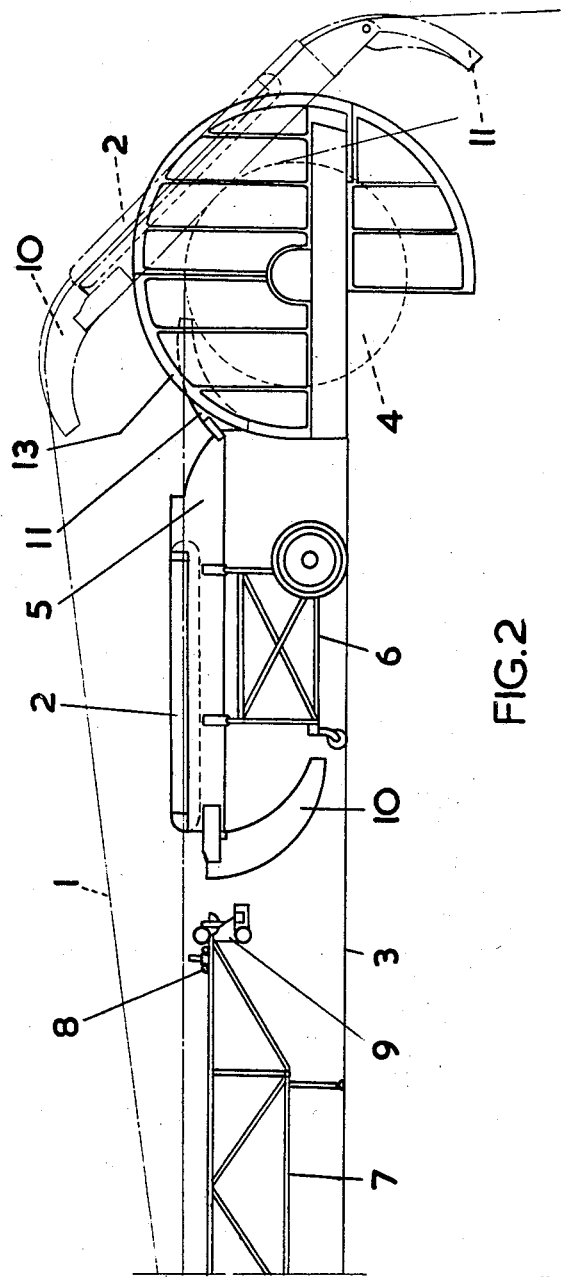
Figure 2 is a similar view of the same with the repeater shown at a later stage in the procedure.
Figure 3:
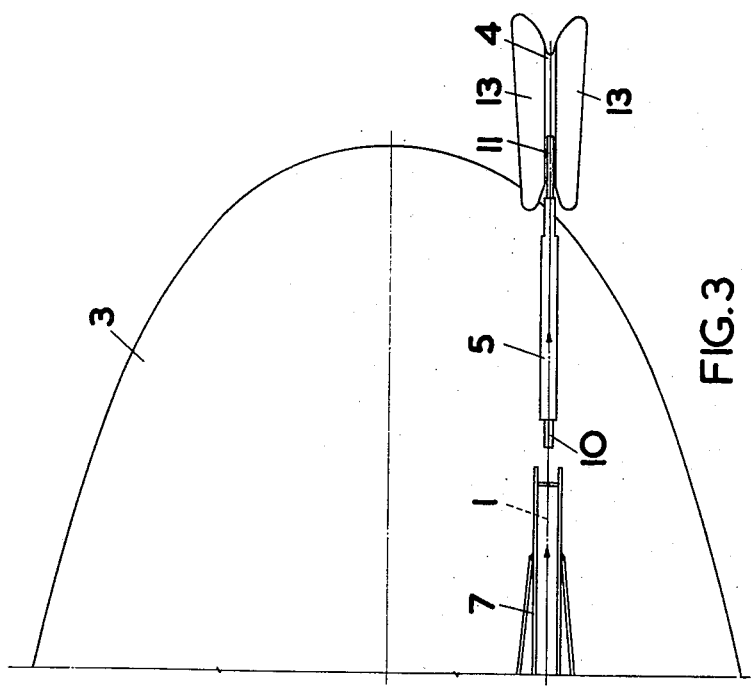
Figure 3 is a plan of the same with the repeater omitted.

The aft extension 11 is capable of pivoting upwards from its normal position, and, while the cradle 5 and trolley 6 are moving aftwards with the repeater 2 in the cradle, said aft extension 11 is pivoted upwards and permitted to rest on the sheave 4 as shown in Figures 1 and 2. While the cradle is on the trolley it supports the repeater with its axis in line with the top of the sheave, but as said cradle continues to move aftwards, the extension 11 climbs up the sheave until its undersurface, which may be arcuate to about the same radius as the sheave, fits the periphery of said sheave. Thereafter, the main body of the cradle begins to ride around the sheave and the extension 11 is moved, by the tension of the cable, to its normal position.

This operation first tilts the cradle upwards, and then carries it bodily, from the trolley 6. Said trolley at a given point abuts against the guard or "whiskers" 13 of the sheave and is thereby arrested. The cradle after it is clear of the trolley 6 moves around the sheave 4 as shown in chain dotted lines in Figure 2, and it will be seen that as it thus moves around the sheave it protects the repeater 2 from the bending movement which, owing to the tension of the cable 1, it would have had to support if it had passed around the cable without the cradle. More important still, the curved upper surfaces of the end extensions 10 and 11 of the cradle ensure that the cable leaving the ends of the repeater shall follow a smooth curve and shall nowhere be subject to a sharp bend as would be the case if the repeater moved around the sheave without the cradle.

Shortly afterwards the cradle will move around to a position at which the (normally) undersurface of the end extension 10 fits on the periphery of the sheave, and subsequently it will drop away from the sheave altogether into the sea, leaving the repeater, which is now also fully clear of the sheave to pass with the cable into the sea.

An eyelet lug 14 attached to the end extension 10 is connected to the ship by means of a suitable rope, and this enables the cradle to be recovered from the sea ready for re-use when the next repeater is due to pass into the sea.

Figure 5:
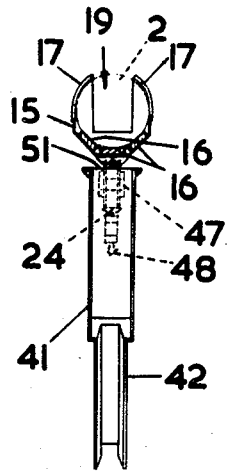
Figure 5 is an end view looking from the left of Figure 4.
Figure 8:
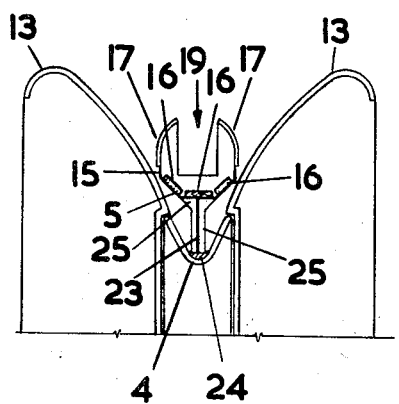
Figure 8 is a section on line VIII—VIII of Figure 6.
Figure 9:
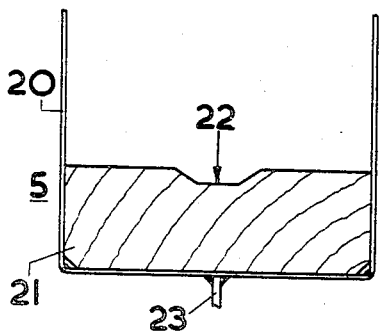
Figure 9 is a section on line IX—IX of Figure 6.

Describing now the construction of the cradle 5 in more detail, the main body of said cradle comprises a trough 15 of sheet metal. Throughout the major portion of its length from its forward end said trough 15 is shallow having the section of a semi octagon as best shown in Figures 5 and 8, and, throughout the length of said shallow portion, the three lower facets thereof are lined by boards 16 of wood. At its aft end the side walls of said trough extend up higher and are curved inwardly as shown at 17 so that, when the repeater 2 is slid into position in the trough on the boards 16 its aft end will be held down in the trough.

The aft end of said trough 15 is closed by means of an end wall 18 which prevents passage of the repeater 2 but said end wall is cut away at 19 to give passage way to the cable. The aforesaid abutment 12, against which the aft end of the repeater abuts is constituted by a wooden block resting against said end wall 18 and cut away in like manner as said end wall.

Secured rigidly to, and projecting longitudinally from the aft end of the trough 15 is a channel shaped part 20 of sheet metal which extends from said trough on a smooth downward curve which merges with said trough. This part 20 has its bottom lined with timber 21 which has a groove 22 on its upper surface for guiding the cable 1.

The whole of the main portion of the cradle, including the trough 15 and the channel-shaped part 20 is stiffened by means of a longitudinal keel-like plate 23 whose upper edge is welded centrally along the bottom of said trough 15 and along the bottom of said part 20. This plate 23 has a strengthening flange 24 welded along its bottom edge and a plurality of vertical stiffening fins 25 in transverse planes are welded on both sides of the longitudinal plate 23 at spaced intervals therealong, said fins 25, at the bottom, being welded to the flange 24, and, at the top, to the bottom of the trough 15 or channel-shaped part 20.

The aft end portion of the channel-shaped part 20 is stepped at 26 so as to be narrower than the remainder and the aforesaid aft extension 11 is hinged to the end of this narrower portion. Said aft extension 11 consists of an arcuate channel-shaped part 27 with a keel-like plate 28 having its upper edge welded centrally along the bottom of said channel-shaped part. Said plate 28 has a strengthening flange 29 welded along its bottom edge, and a plurality of vertical stiffening fins 30 in transverse planes similar to the fins 25 are welded on both sides of said plate 28.

For hinging the aft extension 11 to the channel-shaped part 20, a pair of side plates 31 are bolted to the forward ends of the side walls of the channel-shaped part 27 so as to project forwards and the projecting ends of said side plates 31 are pivoted respectively to the side walls of said channel-shaped part 20 by means of pivot pins 32.

The forward end of the keel-like plate 28 carries a small block 33, the arrangement being such that, when the aft extension 11 is pivoted downwards, said block 33 abuts against the flange 24, when said aft extension 11 reaches the normal position and thereby prevents any further downward pivoting. At this position, the curvature of the channel-shaped part 27 forms a smooth continuation of the curvature of the channel-shaped part 20. The bottom of the channel-shaped part 27 is lined with timber 34 which has a groove 35 on its upper surface for guiding the cable 1 and said groove 35, when said extension 11 is at the normal position forms a smooth continuation of the groove 22.

The upward pivoting of the aft extension 11 is limited by the abutment of the forward edge 36 of each side plate 31 abutting against a stop block 37 mounted on the respective side wall of the channel-shaped part 20. When said aft extension is first brought up against the sheave 4, as in Figure 1, said aft extension 11 is held at said limiting up position by means of a rope 38 connected between eyeletted lugs 39 and 40 mounted respectively on the channel-shaped part 20 and the channel-shaped part 27, as shown in Figure 4. When the cradle moves around the sheave 4 to the position shown in chain-dotted lines in Figure 2 the tension of the cable forces the aft extension 11 down to the normal position and thereby breaks the rope 38.

Figure 12:
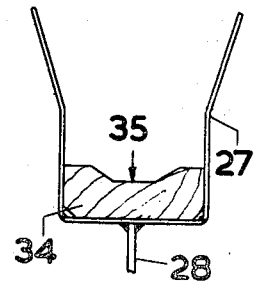
Figure 12 is a section on line XII—XII of Figure 6.
Figure 10:
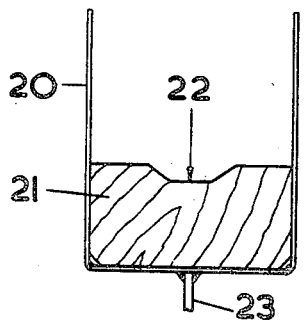
Figure 10 is a section on line X—X of Figure 6.
Figure 11:
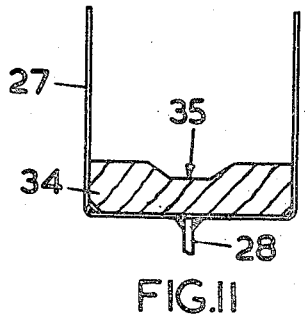
Figure 11 is a section on line XI—XI of Figure 6.

It will be seen that the channel-shaped part 27 of the aft extension is stepped so that its end portion is narrower than the portion which is pivoted to the channel-shaped part 20. This is best shown in Figures 11 and 12. Moreover the side walls of the narrower end portions are flared outwards.

The forward extension 10 consists of two channel-shaped parts 41 and 42 secured rigidly together end to end and a keel-like plate 43 with its upper edge welded to the undersides of said parts 41 and 42. The channel-shaped part 41 is of identical section with the channel-shaped part 20 where the section line IX—IX is placed and the channel-shaped part 42 is identical with the channel-shaped part 27 where the section line XII—XII is placed, and both said channel-shaped parts are lined with timber with a groove in it which forms a guide for the cable 1. In Figures 5 and 7 this timber lining has been omitted for clearness. Said channel-shaped parts together form an arcuate curve so that the groove in the timber lining forms a continuous smooth guide for the cable 1, where said end extension 10 is pivoted upwards to its normal position shown in Figure 6.

Said keel-like plate 43 has a strengthening flange 44 welded to its bottom edge, and stiffening fins 45 are welded to the two sides of said plate 43 and to the flange 44 and bottoms of the channel-shaped parts 41 and 42.

For pivoting said forward extension 10 to the main body of the cradle 5, the keel-like plate 23 has two side plates 46 bolted to it and projecting from its forward end, and the aft end of said keel-like plate 43 is pivotally mounted between the side plates 46 by means of a pivot pin 47. Said keel-like plate 43 is formed with a bossed hole 48 through it, and when said forward extension 10 is pivoted upwards to its normal position said bossed hole comes just above the upper edge surfaces of the plates 46. A pin 49 is then placed in the hole 48 with its ends projecting, and said projecting ends rest on the plates 46 and thereby maintain said extension 10 at the up position. The reference 50 designates two studs mounted on the plates 46. The upper ends of these studs project just above the upper edge surfaces of said plates 46 and thereby prevent endwise movement of the pin 49.

The aft end of the channel-shaped part 41 is closed by means of a plate 51, and this plate 51, when the forward extension 10 is at its normal or up position closes the forward end of the trough 15 and thereby restrains the repeater 2 against forward movement relative to the cradle. Said plate 51 is suitably cut away to give free access to the cable itself.

I claim:

1. In a cable laying system, a sheave fixed on a ship, a cable on said ship passing over said sheave into the sea, said cable being provided with rigid bodies at spaced intervals, and a cradle engaging one of said rigid bodies and carrying said rigid body over said sheave, said cradle comprising a main body having a trough which receives the rigid body and arranged with an abutment at the outboard end of the trough which abuts the rigid body and cause the cradle to travel with the cable and rigid body, arcuate extensions pivoted on each end of the main body and each arcuate extension having a trough which supports the cable portions adjacent the rigid body, and means to support the cable, rigid bodies and cradle in a horizontal plane and in straight alignment with the sheave.

2. A cable laying system as claimed in claim 1, wherein the exterior bottom of the main body is arranged with a straight surface which engages the sheave at a tangent causing the cradle to slide in an inclined plane from the sheave into the sea and the undersurfaces of the extensions are arcuate corresponding with the arc of the sheave which facilitates the engagement of the cradle with the sheave and the disengagement of the cradle from the sheave.

3. A cable laying system as claimed in claim 1, wherein the means to support the cable, rigid bodies and cradle comprises a supporting structure for the cable and rigid bodies fixed in a horizontal plane above the deck of the ship and spaced from the inboard side of the sheave, and a trolley movable on the deck of the ship and supporting the cradle between the supporting structure and the sheave and in a horizontal plane of said supporting structure.

4. A cable laying system as claimed in claim 1, wherein the trough surface of the outboard end of the main body is curved corresponding with the arc of the trough of the outboard extension.

5. In a cable laying system as claimed in claim 1, means removably mounted in the inboard extension to engage the main body and lock the extension in its mating position with the main body.

6. In a cable laying system as claimed in claim 1, a rope connecting the outboard end of the main body to the outboard extension and retaining the outboard extension in the horizontal plane of the main body and severable by the tension of the cable on the outboard extension.

7. A cable laying system as claimed in claim 1, wherein the troughs of the outboard end of the main body and of the extensions are lined with wood grooved for guiding the cable.

8. A cable laying system as claimed in claim 1, wherein the sheave is equipped with radially extending guards of sufficient width and height for preventing the main body from tilting on its sides as it slides over the sheave.

9. A cable laying system as claimed in claim 1, wherein the main body is of greater length than the rigid body for relieving the rigid body of a substantial part of the bending force to which the rigid body would be subjected when passing over the sheave.

References Cited in the file of this patent
UNITED STATES PATENTS

| | | |
|---|---|---|
| 2,812,640 | Hartley | Nov. 12, 1957 |

FOREIGN PATENTS

| | | |
|---|---|---|
| 721,014 | Germany | May 22, 1942 |
| 824,359 | Germany | Dec. 10, 1951 |
| 893,068 | Germany | Oct. 12, 1953 |
| 163,161 | Australia | June 1, 1955 |